United States Patent [19]

Moss

[11] Patent Number: 4,620,630

[45] Date of Patent: Nov. 4, 1986

[54] COMPACT DISC IN CONVERTIBLE ENCLOSURE

[76] Inventor: Ira L. Moss, 176 Beach 146th St., Neponset, Queens, N.Y. 11694

[21] Appl. No.: 788,932

[22] Filed: Oct. 18, 1985

[51] Int. Cl.⁴ .............................................. B65D 85/57
[52] U.S. Cl. ........................... 206/45.24; 206/45.33; 206/313; 206/806; 211/40; 229/68 R
[58] Field of Search .............. 206/45.31, 45.33, 44 R, 206/232, 307, 309, 310, 311, 312, 313, 444, 445, 806, 45.24–45.27; 211/40; 229/68 R, 71, 72

[56] References Cited

U.S. PATENT DOCUMENTS

| | | | |
|---|---|---|---|
| 3,199,768 | 8/1965 | Farmlett | 229/68 R |
| 3,207,318 | 9/1965 | Gilbert | 229/68 R |
| 3,340,999 | 9/1967 | Froehlig | 206/309 |
| 3,865,234 | 11/1975 | Kester | 206/45.33 |
| 4,339,034 | 7/1982 | Panveno | 206/313 |
| 4,369,882 | 1/1983 | Schluger | 206/45.33 |
| 4,566,590 | 1/1986 | Manning et al. | 206/312 |

FOREIGN PATENT DOCUMENTS

| | | | |
|---|---|---|---|
| 1264078 | 5/1961 | France | 229/68 R |
| 0239027 | 9/1925 | United Kingdom | 206/313 |

*Primary Examiner*—William Price
*Assistant Examiner*—Jimmy G. Foster
*Attorney, Agent, or Firm*—Arthur B. Colvin

[57] ABSTRACT

An article of manufacture is comprised of a compact disc and an enclosure therefore, the enclosure being convertible from a pilfer resistant merchandising mode to a compact storage mode. The enclosure includes a disposable stiffener member which functions also, in the merchandising mode, as a pilfer deterrent.

4 Claims, 5 Drawing Figures

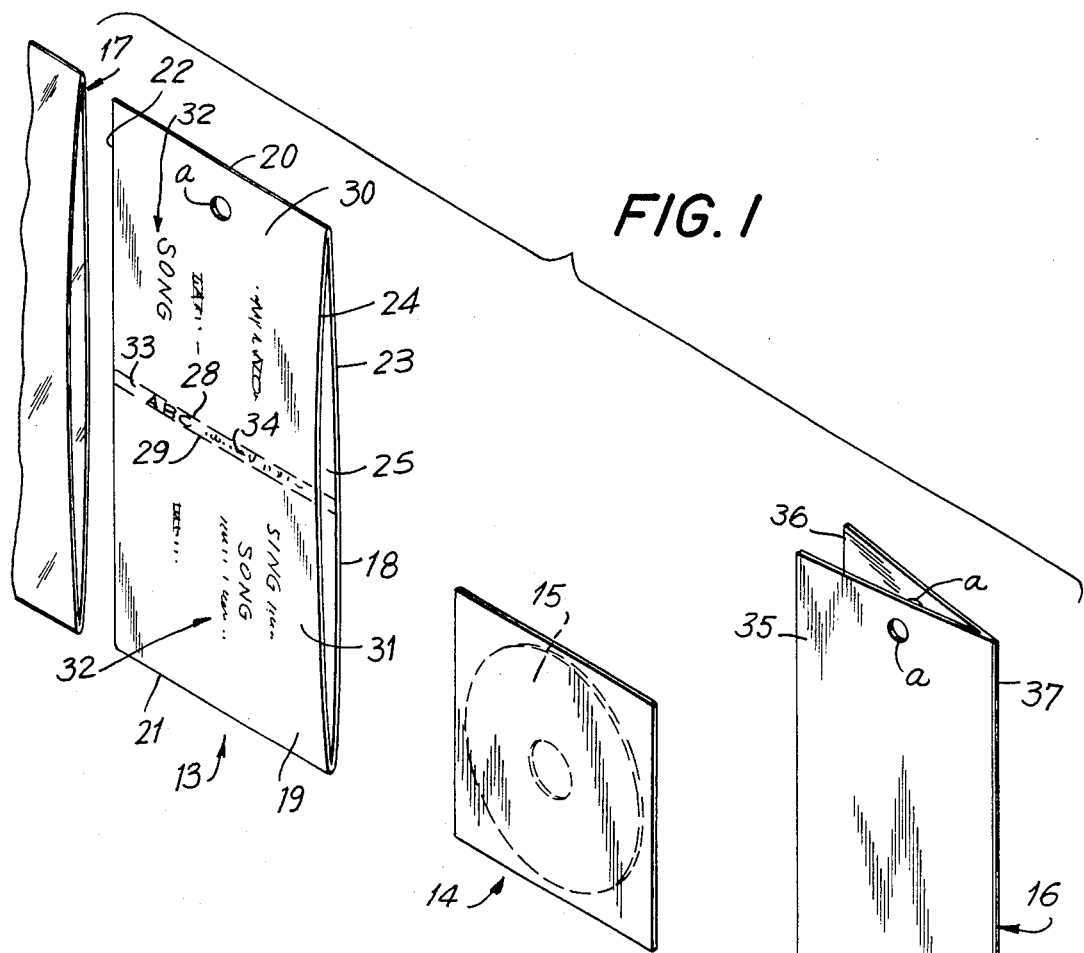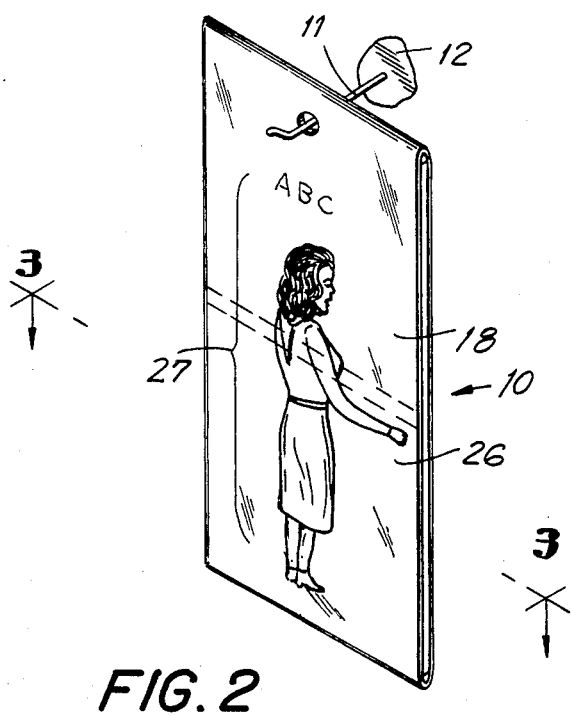

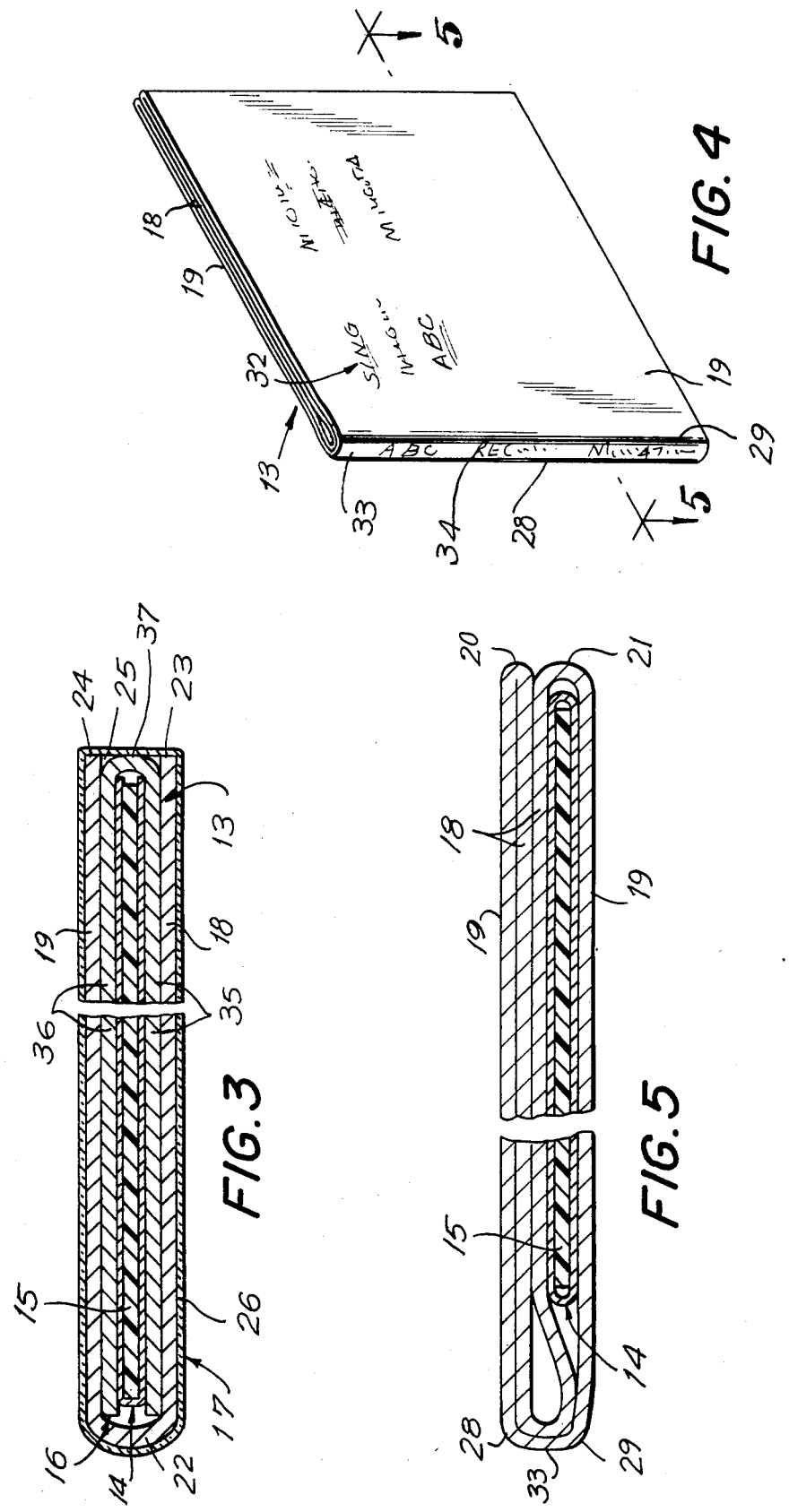

COMPACT DISC IN CONVERTIBLE ENCLOSURE

BACKGROUND OF THE INVENTION

1. Field of the Invention

The present invention relates to the field of compact discs, and pertains more particularly to an article of manufacture comprising a compact disc and convertible enclosure therefore, the enclosure being convertible from a display or merchandising mode to a storage mode.

2. The Prior Art

The compact disc, as is well know, is becoming a progressively more popular medium for the replication of music in the home. The compact disc comprises a thin polymeric circular member of approximately 4¾" (12 centimeters) in diameter and having a central aperture adapted to be received on the spindle or centering mechanism of a disc player. The compact disc incorporates on a surface thereof digitally encoded information which is adapted to be laser read by the disc player. It is possible to incorporate an hour or more of music on a single compact disc, and it is generally agreed that the quality of musical reproduction of the disc equals or exceeds the quality of music obtainable with the finest of conventional long playing records.

At present compact discs are costly to manufacture and accordingly sell at retail prices in the range of from about $14.00 to $20.00 Dollars per disc.

Initially, compact discs were marketed in rigid plastic containers, the overall dimensions of which only slightly exceeded the size of the disc. Unfortunately, due to the relatively small size of the container, and perhaps also to the relatively high price of compact discs, a high incidence of pilferage was encountered, since the container could easily be slipped into the pocket of a shoplifter. As a result, discs were stored under lock and key, and a prospective purchaser was required to request access to a given disc in order to review the printed information on the disc packaging.

More recently, in order to render the disc container less susceptible to theft while permitting access of prospective purchasers without the attention of supervisory store personnel, the polymeric rigid container for the disc has been bonded or otherwise affixed to a cardboard panel of approximately twice the size of the disc container. The cardboard panel has been provided with an aperture enabling the panel to be suspended on a dispensing rack.

The sole purpose of employing an enlarged cardboard panel in connection with disc packaging heretofore employed was to render the composite article sufficiently large as to minimize the possibility of a thief secreting the package in a pocket.

After purchase of discs packaged in the manner hereinabove set forth, the cardboard support panel is discarded and the disc stored in its polymeric "jewel box" container. The polymeric containers, while effective to prevent warpage of the discs, are relatively costly and added significantly to the purchase price of the finished article. In addition, it is possible to separate the plastic container from the enlarged panel and pocket the container, increasing the possibility of theft.

SUMMARY OF THE INVENTION

The present invention may be summarized as directed to a new article of manufacture, namely to a compact disc and enclosure therefore, characterized in that the enclosure is convertible from a merchandising mode in which mode the composite article is sufficiently large to preclude shoplifting, the device after purchase being foldable to a compact storage mode.

The invention is directed further to an article of the type described wherein the disc is protected against bending or warpage in both the merchandising mode and in the storage mode.

The invention is directed further to an article of the type described which is significantly lower in cost than the package heretofore employed for compact discs and which possesses the additional advantage of a high degree of pilfer resistance.

In accordance with the invention there is provided an outer enveloped which is elongate in the vertical direction and includes a laterally open-mouth portion. The compact disc which is preferably enclosed in a thin paper sleeve is disposed in the envelope adjacent the lower edge thereof. The vertical extent of the envelope is at least twice the diameter of the disc.

A stiffener member comprising front and rear panels hingedly connected is disposed within the envelope with the front and rear panels straddling the disc, and with the hinge line of the stiffener substantially coincident to the mouth portion of the envelope. The envelope incorporates spaced hinge lines such as to permit the envelope to be transversely bent after removal of the stiffener. Preferably, the composite article is encased within a glassine or like transparent sleeve or sheath. Desireably, registering apertures are formed through the layers of the envelope and stiffener adjacent the top edge thereof whereby the composite article may be mounted on the dispensing rod of a merchandising rack or the like.

The article is imprinted in such manner that a perspective purchaser viewing the front face of the article when suspended from a merchandising rack will have full access to the information necessary to determine on a purchase. The rear surfaces of the article will, after purchase and removal of the glassine envelope and stiffener, define the outermost surfaces of the article during storage.

In the storage mode, there will be exposed a front, a rear, and a central spine surface all of which surfaces will be formed by the rear panel of the device when in the merchandising mode. Accordingly, the elements of the rear surface of the device are imprinted with further information and means for effecting selection in directions which will be appropriate when the article is converted to the storage mode.

From the foregoing, it will be perceived that it is an object of the invention to provide an improved article of manufacture comprising a tamper and theft resistant convertible envelope or container encompassing a compact disc.

A further object of the invention is the provision of an article of the type described, which in its various modes provides secure protection of the disc against warpage or the like.

Still a further object of the invention is the provision of an article of the type described which is highly resistant to removal of the disc until after the same has been purchased.

A still further object of the invention is the provision of an article of the type described which is of significantly lower manufacturing costs than compact disc merchandising enclosures heretofore known.

In order to attain these objects and such other objects as may appear herein or be hereinafter pointed out reference is made to the accompanying drawings in which:

FIG. 1 is a pre-assembled perspective view of the components of the article taken from the rear.

FIG. 2 is a front perspective view of the packaged articles as displayed on a merchandise rack.

FIG. 3 is an enlarged horizontal section taken on the line 3—3 of FIG. 2.

FIG. 4 is a perspective view of the article in the storage mode.

FIG. 5 is an enlarged horizontal section taken on the line 5—5 of FIG. 4.

Turning now to the drawings, there is disclosed in FIG. 2 a packaged compact disc assembly 10 in the merchandising mode thereof, i.e. as the same would be accessible to a prospective purchaser. The album 10 may be arrayed on a counter of the selling establishment but often times will be supported as by a dispensing rod 11 extending from a dispensing rack or like merchandising display 12.

The components of the album are best appreciated from an inspection of FIG. 1 the same comprising an outer envelope 13, a thin paper sleeve 14 within which the compact disc 15 is encompassed, a stiffener member 16, and a glassine or like transparent film outer wrapping 17.

The envelope 13 which is preferably comprised of cardboard or like relatively rigid material includes a front rectangular face or panel 18 and a rear rectangular face or panel 19, the panels 18,19 being connected together at their upper and lower end edges 20 and 21 respectively and along one elongate side edge 22. As shown, the lengthwise extent of the envelope 13, is at least twice the diameter of the sleeve 14 encompassing the compact disc.

The unconnected edges 23,24 of the front and rear panels 18 and 19 together define an open-mouth portion 25. As best seen in FIG. 2, the front face 26 of the front panel 18 may be marked with first indicia means 27 which, as is conventional, will include materials identifying the artist, composition, composer, and like informative and promotional materials. As is apparent from FIG. 2, the first indicia means 27 is arrayed so as to be susceptible of being read when the device is vertically disposed in the manner shown in FIG. 2.

The rear panel 19 of envelope 13 is provided with a spaced parallel pair of transversely directed fold or hinge lines 28,29 which may be formed as by scores or the like. The hinge lines 28,29 are disposed parallel to the end edges 20 and 21, the lines 28,29 being disposed at opposite sides of the longitudinal center line of the envelope.

As is most readily apparent from FIG. 1, the upper-half and lower-half 30 and 31 respectively of the rear panel 19 are marked with second indicia means 32, the second indicia means being arranged in a vertical direction i.e. paralleling the side edge 22 of the envelope.

The area 33 defined between hinge lines 28 and 29 is marked with a third indicia 34, the third indicia running in a transverse direction.

The stiffener member 16 includes first and second rectangular panels 35,36 connected at fold line 37. The panels 35,36 are sized to permit the stiffener member to be sleeved through the open-mouth 25 into envelope 19, and when thus positioned the fold line 37 will lie essentially coincident with the mouth portion 25.

Preferably, the front and rear panels 18 and 19 and the first and second panels 35,36 of the stiffener member are provided with apertures "a" which in the inserted position of the stiffener within the envelope will all lie in registry.

The device is assembled by sleeving the disc containing envelope 14 into the lower part of the envelope 13 in the area between the lower end edge 21 and the lower hinge line 29. Thereafter, the stiffener member is inserted into the envelope through the mouth 25 thereof in such manner that one panel 35 is disposed between the disc and the rear panel 19 and the other panel 36 is disposed between the disc and the front panel 18. With the parts thus positioned a glassine or like transparent film wrapper is sealingly mounted over the described assembled components. As noted, the device in the described merchandising mode may be mounted on the hangar of a rack display or the like by passing the hangar rod 11 through the four registering apertures of the noted panels and through the glassine film.

From the above description, it will be apparent that in the described merchandising mode, the stiffener member 16 operating in conjunction with the stiffness imparted by the front and rear panels 18,19 of envelope 13 function to prevent any bending or warping of the packaging which might distort or bend the disc 15. In particular, the stiffener functions to prevent any flexure or folding of the panels 18,19 about the hinge lines 28,29. While such hinge lines have been described as being formed in the rear panel, it will be appreciated from the ensuing description that it may be desirable to form the same also in the front panel.

Moreover, while the panels 18 and 19 have been illustrated as comprised of integral rectangular panels preferably incorporating transverse scores to define the hinge lines 28 and 29, it will be readily appreciated that the front and rear panels may each be composed of two rigid sections connected together by a flexible band in registry with the area 33 between the hinge lines 28,29. In such construction, the hinge lines would, of course, be defined at the interface between the two panels and the connecting flexible band.

After the album has been purchased, the user will strip the glassine film 17, remove and discard the stiffener member 16, thereby enabling access to and removal of the disc 15 and its enclosing envelope 14. After the disc is replaced in the envelope 13, the envelope is thereafter folded along the hinge lines 28,29 whereupon the composite product will assume the storage mode or configuration illustrated in FIG. 4.

It will be observed from the preceding description that the disc 15 is at all times, i.e. in the merchandising mode of FIG. 2 and in the storage mode of FIG. 4, protected against warping by four layers of rigid material. In the merchandising mode, the four layers are provided by the front and rear panels of the envelope, and in first and second panels of the stiffener. In the storage mode, the four layer protection is effected by doubled layers of the front and rear panels 18 and 19.

The device, in the merchandising mode, will be recognized to be highly resistant to pilferage. The size of the unit renders the same resistant to concealment in the pocket of a prospective thief.

Additionally, it is impossible to remove the disc from its container without completely removing the glassine wrapper and also completely removing the stiffener from its straddling position of the disc.

As will be evident to those familiarized with the instant disclosure, the same is susceptible to numerous variations in details of construction without departing from the spirit of the present invention.

Accordingly, the same is to be broadly construed within the scope of the appended claims.

Having thus described the invention and illustrated its use, what is claimed as new and desired to be secured by Letters Patent in the United States is:

1. As a new article of manufacture a compact disc and convertible display and storage enclosure therefore comprising in combination an outer envelope including elongate front and rear rectangular panels, a lengthwise dimension of said panels being at least twice the diameter of said disc, said panels having short upper and lower end edges and elongate side edges, said end edges and one of said side edges being mutually connected, the other said side edges defining therebetween an open-mouth portion, upper and lower transversely directed parallel hinge lines formed in said panels, said hinge lines lying parallel to said end edges and being disposed in proximate relation to and at opposite sides of a line extending between and bisecting said side edges, a compact disc member disposed within said envelope in the area between said lower end edges of said panels and said lower hinge line, a stiffener member comprising first and second rectangular panels connected at a central longitudinally directed fold line, said first and second panels being nested within said envelope and encompassing said disc member with said fold line of said stiffener member in substantial registry with said mouth portion, and a removable film member encompassing and sealing said envelope to thereby retain said stiffener member and hence said disc in said envelope, said envelope after removal of said film and stiffener member being foldable about said hinge lines to thereby shift surfaces of a said panel into juxtaposed condition thereby to define a compact storage container for said disc.

2. An article in accordance with claim 1 and including first indicia means on said front panel, said first indicia means extending in a direction transversely of said front panel, second indicia means on said rear panel extending in a direction longitudinally of said rear panel, and third indicia means on said rear panel in the area between said hinge lines, said third indicia means being directed transversely of said panels.

3. An article in accordance with claim 2 wherein said hinge lines are defined by score lines extending part way through at least one of said panels.

4. An article in accordance with claim 2 and including registering hangar apertures formed through said front and rear panels and through the panels of said stiffener member.

* * * * *